United States Patent [19]

Jordan

[11] Patent Number: 5,414,583
[45] Date of Patent: May 9, 1995

[54] CURRENT SOURCE BUS TERMINATOR WITH VOLTAGE CLAMPING AND STEADY STATE POWER REDUCTION

[75] Inventor: Mark Jordan, Manchester, N.H.

[73] Assignee: Unitrode Corporation, Billerica, Mass.

[21] Appl. No.: 195,488

[22] Filed: Feb. 14, 1994

Related U.S. Application Data

[63] Continuation of Ser. No. 810,396, Dec. 19, 1991, abandoned.

[51] Int. Cl.⁶ ............................................... H03K 5/00
[52] U.S. Cl. ........................................ 361/91; 361/119; 327/318; 326/30
[58] Field of Search .................. 361/91, 119; 307/560, 307/360, 475, 208, 549; 333/17, 32

[56] References Cited

U.S. PATENT DOCUMENTS

| | | | |
|---|---|---|---|
| 3,832,575 | 8/1974 | Dasgupta et al. | 307/208 |
| 3,947,776 | 3/1976 | Stevens et al. | 328/147 |
| 4,345,171 | 8/1982 | Harris, Jr. | 307/560 |
| 4,384,216 | 5/1983 | Pricer | 307/270 |
| 4,390,797 | 6/1983 | Ishimoto | 307/264 |
| 4,398,100 | 8/1983 | Tobita et al. | 307/264 |
| 4,421,994 | 12/1983 | Puri et al. | 307/200 B |
| 4,498,021 | 2/1985 | Uya | 307/443 |
| 4,598,216 | 7/1986 | Lauffer et al. | 307/443 |
| 4,612,462 | 9/1986 | Asano et al. | 307/482 |
| 4,647,797 | 3/1987 | Sanwo et al. | 307/443 |
| 4,675,551 | 6/1987 | Stevenson et al. | 307/443 |
| 4,859,877 | 8/1989 | Cooperman et al. | 307/443 |
| 4,947,063 | 8/1990 | O'Shaughnessey et al. | 307/572 |
| 4,970,419 | 11/1990 | Hagen et al. | 307/542 |
| 5,012,384 | 4/1991 | Chew | 361/159 |
| 5,029,284 | 7/1991 | Feldbaumer et al. | 307/443 |
| 5,089,948 | 2/1992 | Brown et al. | 363/58 |

Primary Examiner—Marc S. Hoff
Assistant Examiner—S. Jackson
Attorney, Agent, or Firm—Weingarten, Schurgin, Gagnebin & Hayes

[57] ABSTRACT

A bus terminator, for a computer bus, which is capable of providing maximum allowable current to the bus, voltage clamping of the bus and steady state power reduction when the bus is in the positive steady state.

30 Claims, 5 Drawing Sheets

CURRENT SOURCE BUS TERMINATOR WITH VOLTAGE CLAMPING AND STEADY STATE POWER REDUCTION

This application is a continuation of application Ser. No. 07/810,396, filed Dec. 19, 1991.

FIELD OF THE INVENTION

The invention relates to the field of computer buses and specifically to the field of bus terminators for computer buses.

BACKGROUND OF THE INVENTION

In a computer system, the processor, the memory, and the input/output (I/O) devices communicate with one another by way of a bus. A bus is a cable having a series of conductors, each of which is capable of transmitting signals which represent either data to be transferred between devices on the bus or control information, such as device addresses, which determine when and to where the data being transferred by the bus is to be transferred. The signals transferred on the bus typically take the form of rapidly changing bi-stable voltage levels. These voltage levels are placed on the conductors by bus drivers incorporated into each device which communicates with the bus. For optimum signal power transfer between devices and minimum signal reflection, the bus must be terminated in such a way that the impedance of the terminator matches the impedance of the bus.

A bus standard defines the bus termination impedance for a particular bus. However, in practice, bus impedance varies among individual buses so that the constant termination impedance imposed by the standard can result in a significant impedance mismatch. Thus, although the bus terminator actually has the predefined impedance required by the bus standard, significant signal reflections can occur. Because the data on the bus can not be sampled until any signal reflections decay, the speed at which data can be transferred over the bus is limited.

For example, the Small Computer Systems Interconnect (SCSI) bus standard specifies that the bus terminators should provide 110 ohms of impedance. However, in practice the impedance of the SCSI bus cable typically varies from 45 to 95 ohms and hence a 110 ohm terminator would provide an imperfect impedance match, leading to signal reflections.

Active terminators have been constructed with a resistance connected to a positive regulated voltage. However, such a terminator design results in imperfect impedance matching due to variations in cable impedance. Other active terminators have included positive and negative voltage clamping circuits which absorb signal energy from a reflected signal and thereby reduce the decay time of the reflected signal. One problem that arises in these voltage clamping terminators is that the lower clamp is typically set to approximately 0.5 V. Since bus drivers typically can drive the bus below this voltage, large instantaneous currents can flow through the cable to the driver. For example, instantaneous currents in excess of 100 ma have been observed on a SCSI bus having voltage clamping terminators. This current far exceeds the 22.4 ma of current per terminator permitted by the SCSI specification.

The present invention relates to a bus terminator which is capable of: sourcing a constant current to the bus, both positive and negative voltage clamping of the bus to reduce signal reflections, and reducing power consumption when the bus is in the high level steady state.

SUMMARY OF THE INVENTION

The invention relates to a bus terminator for a computer bus which is capable of sourcing a constant current when the bus is below a predetermined positive clamping voltage. The bus terminator will source the constant current both during a bus transition and even when the bus low level state is substantially at zero volts. The bus terminator voltage clamps the bus to reduce signal reflections and ringing and is capable of reducing power consumption when the bus is in the high steady state.

In one embodiment the terminator includes a current source, a positive voltage clamp, and a negative voltage clamp. A feedback circuit from the positive voltage clamp reduces the current flow when the bus is in the high steady state.

In one embodiment the current source, negative voltage clamp and positive voltage clamp include a disconnect feature to electrically remove the terminator from the bus.

BRIEF DESCRIPTION OF THE DRAWING

These and other features and advantages of the invention will be more readily understood in view of the accompanying specification and drawings in which.

DESCRIPTION OF THE PREFERRED EMBODIMENT

Figure 1:
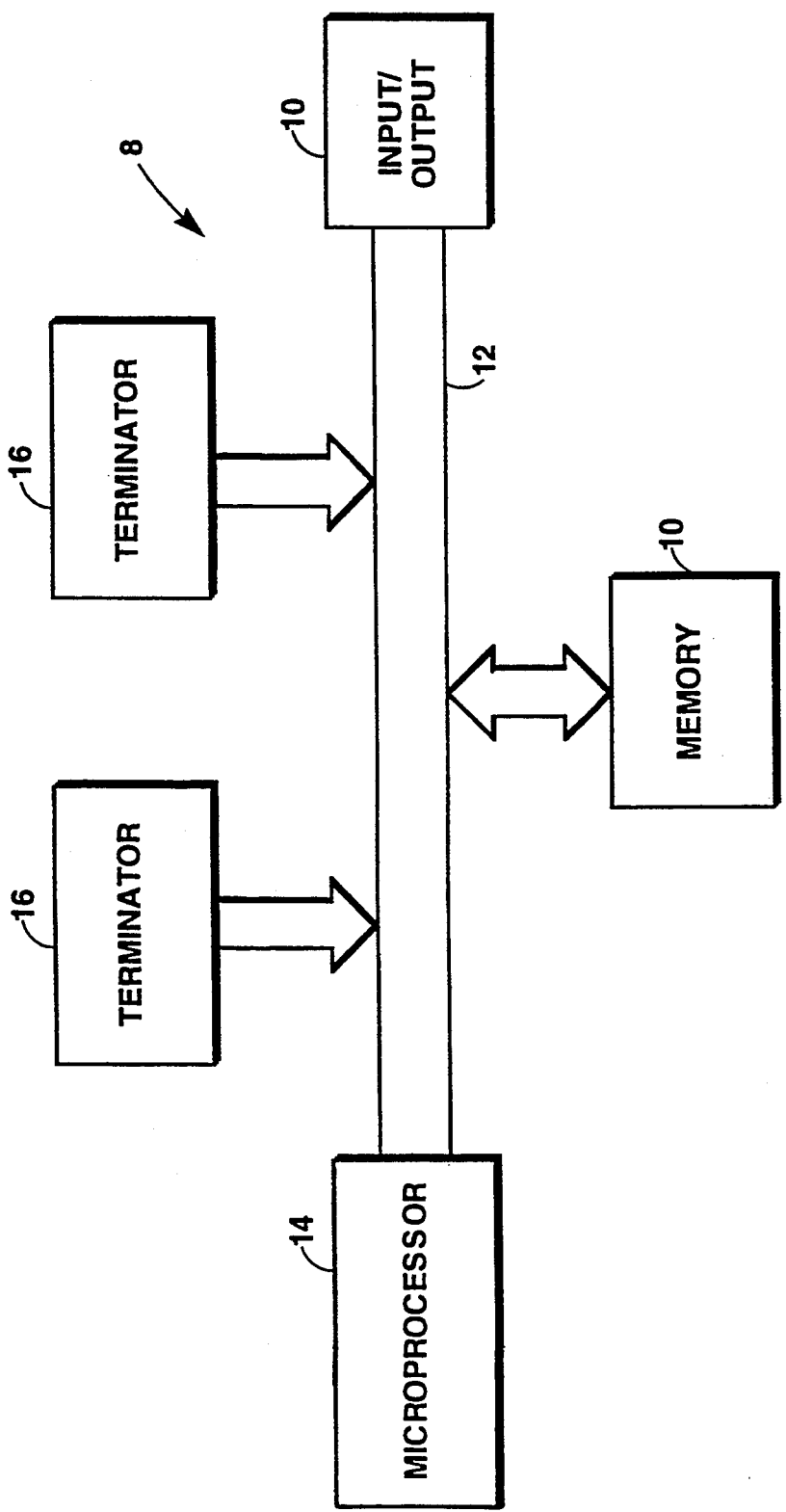
FIG. 1 is a diagram of a computer system utilizing a bus terminator known to the prior art.

Referring to FIG. 1, a computer system 8 includes a series of devices 10 each communicating with a processor 14 and one another over a bus 12. Each end of the bus 12 terminates at a terminator 16.

Figure 2:
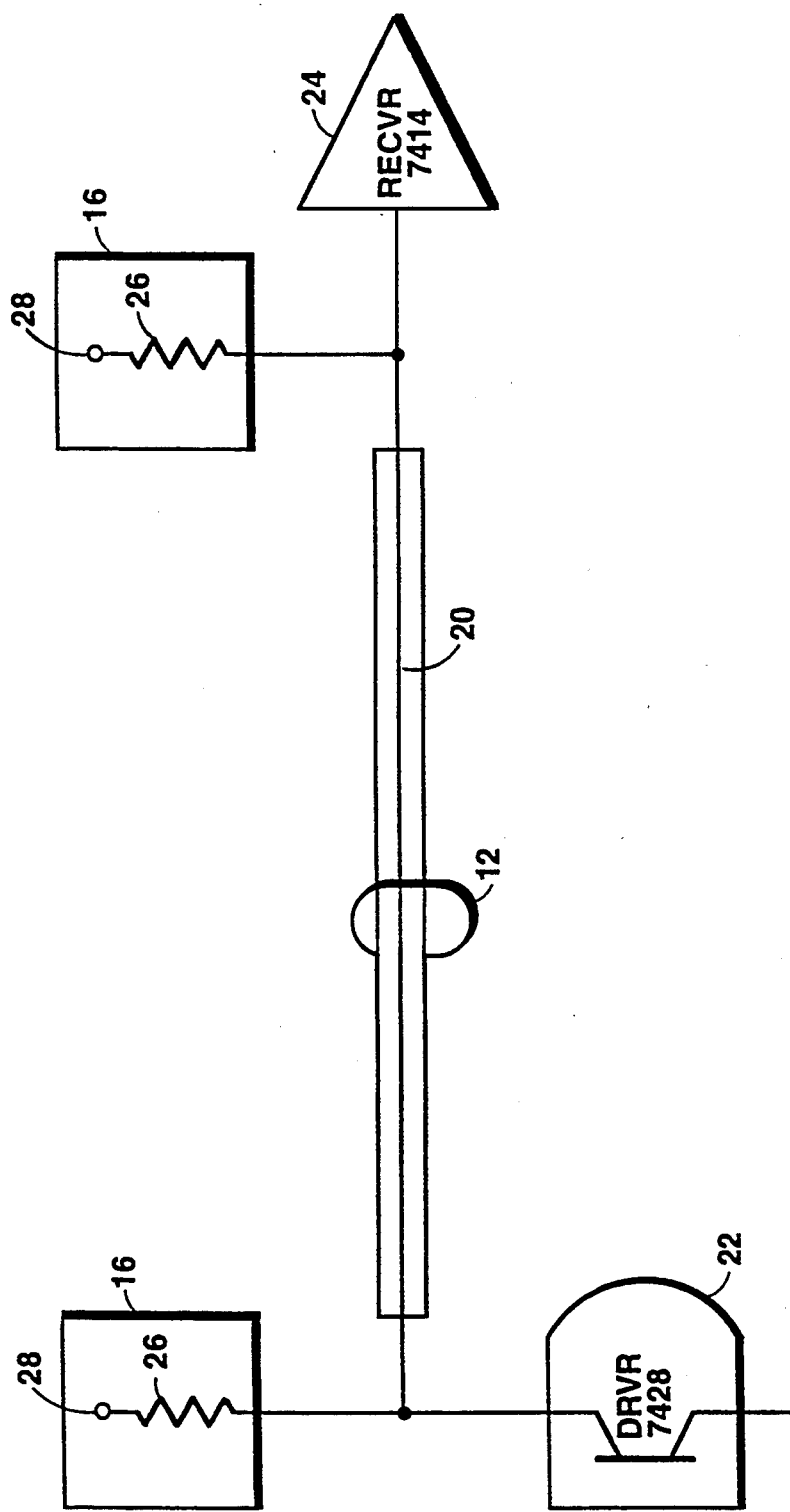
FIG. 2 is a schematic diagram of an embodiment of a terminator known to the prior art.

A bus terminator known to the art is shown in FIG. 2. Although the terminator 16 shown is for use with a SCSI bus 12 (having eighteen individual conductors 20 but with only one shown) similar principles apply to other buses. At one location on each conductor 20 is a bus driver 22, while at another location on the same conductor 20 is a bus receiver 24. Each end of the conductor 20 is in communication with a terminator 16. The terminator 16, in the embodiment for the SCSI bus, is a 110 ohm resistor 26 connected between a 2.85 V voltage source 28 and the conductor 20. As stated previously, this 110 ohm terminator 16 experiences a significant impedance mismatch when used with some SCSI cables.

Figure 3:
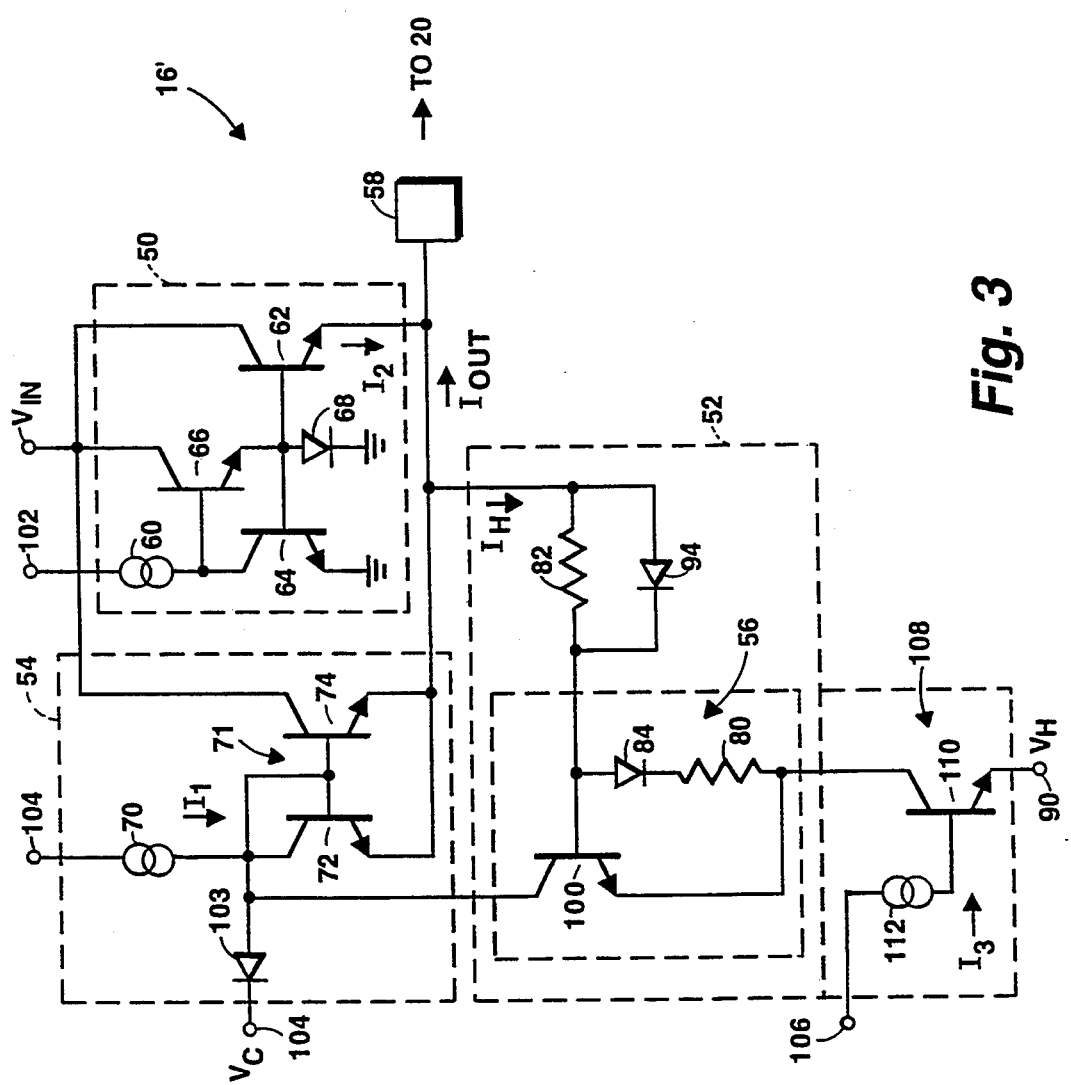
FIG. 3 is a schematic diagram of an embodiment of the invention.

Referring to FIG. 3, in brief overview, an embodiment of a constant current voltage clamping terminator with current limitation 16' includes a constant current source 54, a negative voltage clamp 50, a positive voltage clamp 52, and a current limiting feedback circuit 56. The constant current source 54 provides the maximum current allowable for driving the bus 12. The negative voltage clamp 50 clamps voltage at the terminal 58, which is in communication with the conductor 20, to a predefined voltage level when a negative voltage reflection appears on the conductor 20. Similarly, the positive voltage clamp 52 clamps the voltage at the terminal 58 to a predefined positive voltage level. The current limiting feedback circuit 56 reduces the current supplied to the conductor 20 when current is flowing through the positive voltage clamp, in order to reduce power consumption.

The constant current source 54 includes a static current source 70 (such as a pnp transistor) which supplies current ($I_1$) to a current mirror 71 of transistor 72 and transistor 74. The current mirror 71 produces a current at the output terminal 58 which is equal to the current ($I_1$) from the current source 70 multiplied by the gain of the current mirror 71. The gain of the current mirror 71 is given by the expression $(1+X)$, where X is the ratio of the area of transistor 74 to the area of transistor 72. This constant current source 54 supplies a constant maximum current ($I_{out}$32 $(1+(1+X)I_1$, which, in the case of the SCSI bus, is equal to 22.4 ma) for driving the conductor 20 rather than a current which decreases with increasing bus voltage which would be supplied by the resistor 26 of the terminator shown in FIG. 2. The constant current source 54 limits the current supplied to the conductor 20 to that specified by the bus standard.

The negative voltage clamp 50 includes current source 60 which supplies a current $I_2$, and a current mirror of transistors 62 and 64. Transistor 66, whose base is connected to the current source 60 buffers the current mirror by supplying current as needed. A diode 68 provides a low AC impedance path between the base of transistor 62 and ground.

When the voltage at the output terminal 58 is 0 V, the current output of the current source 60 is $I_2$. If a signal reflection attempts to drive the output terminal 58 negative, the current supplied increases as $I_2*(2^{(Vout/18mv)})$. This exponential response by the current source provides a good negative voltage clamp.

Similarly, the positive voltage clamp 52 includes a pair of resistors 80 and 82 and a diode 84 which are connected in series between the output terminal 58 of the terminator 16' and a supply voltage ($V_H$) 90. The positive voltage clamp 52 also includes a second diode 94 connected in parallel with resistor 82. If the supply voltage 90 is selected such that $V_H=3$ V$-V_{BE}$ (of diode 84), then the positive voltage clamp 52 will clamp when the voltage on the conductor 20 rises to a maximum voltage of $V_H+2$ $V_{BE}$ (one VBE for diode 94 and one $V_{BE}$ for transistor 100). Diode 94 limits the voltage across resistor 82 so that the positive clamp voltage never exceeds $V_H+2$ $V_{BE}$.

Resistor 80, diode 84, and a transistor 100 form the current limiting feedback loop 56. The current limiting feedback loop senses the current through the positive voltage clamp 52 and reduces the current flowing into current mirror 71 until a substantially DC level is reached. Current flowing into the positive voltage clamp 52 causes transistor 100, whose base is connected between resistor 82 and diode 84 and whose emitter is connected to the junction of supply voltage 90 and resistor 80, to conduct. The collector of transistor 100 is connected to the junction of the current source 70 and the current mirror 71.

As transistor 100 conducts it shunts current from the current source 70 away from the current mirror 71, thereby reducing the current supplied to the output terminal 58. That is, the higher 14 the current flow into the positive voltage clamp 52 the more current is shunted away from the current mirror 71. This feedback loop produces a low stable current flow which is determined by resistor 80 and the ratio of the area of transistor 100 to the area of transistor 74. When the stable current flow occurs through the positive voltage clamp 52, the positive voltage clamp voltage will be given by the expression $V_{H+BE}$ of transistor 100)+$I_H$(resistor 82), where $I_H$ is the current flowing through the positive voltage clamp 52. Typically, the stable current will be reduced from 22.4 ma down to 2 ma in the case of the SCSI bus. Therefore, when the conductor 20 is in the positive steady state, the amount of current being supplied to the conductor 20 is reduced so as to reduce power consumption.

In this context, it should be noted that although the bus terminator 16' (for example at the near end of the conductor 20) is capable of regulating the current it supplies to the conductor 20 in order to reduce power consumption, this near end terminator 16' can not control the current supplied to the conductor 20 by the bus terminator 16' at the other (far) of the conductor 20. Resistor 82 provides a fixed resistance at the near end, so that the current from the terminator 16' at the far end of the conductor 20 will preferably flow locally through the positive voltage clamp of the terminator 16' at the far end and be reduced by its feedback circuit.

A diode 103 is connected between the current source 70 and supply voltage 104 set to $V_{in}-V_{BE}$ (of diode 102)$-0.4$ V. This diode 103 clamps the current source 70 by providing a current path at all times and in doing so increases the speed of the device.

Additionally, the terminator 16' may include control circuitry for electrically disconnecting the terminator 16' from the conductor 20. In the embodiment shown, control lines 102, 104, and 106 control the turning on and off of current sources 60, 70 and 112, respectively. When the terminator 16' is to be disconnected from the conductor 20, control lines 102 and 104 turn off the current sources 60 and 70, respectively, removing current from the negative voltage clamp 50 and the constant current source 54, respectively.

Additionally, a positive voltage clamp disconnect switch 108, which in this embodiment, includes current source 112 supplying current $I_3$ to the base of a transistor 110, acts to control the connection between the positive voltage clamp 52 and the power supply $V_H$90. The emitter of transistor 110 is connected to the power supply $V_H$ 90 and the collector is connected to the junction of the emitter of transistor 100 and the resistor 80. When the terminator 16' is to be disconnected from the conductor 20, control line 106 terminates current flow to transistor 110, electrically isolating the positive voltage clamp 52 from the power supply $V_H$. The turning off of the constant current source 54 and the current source 60 of the negative voltage clamp 50 and the disconnecting of the positive voltage clamp 52 from the power supply $V_H$90 causes the terminator 16' to appear as a high impedance to the conductor 20.

Figure 4:
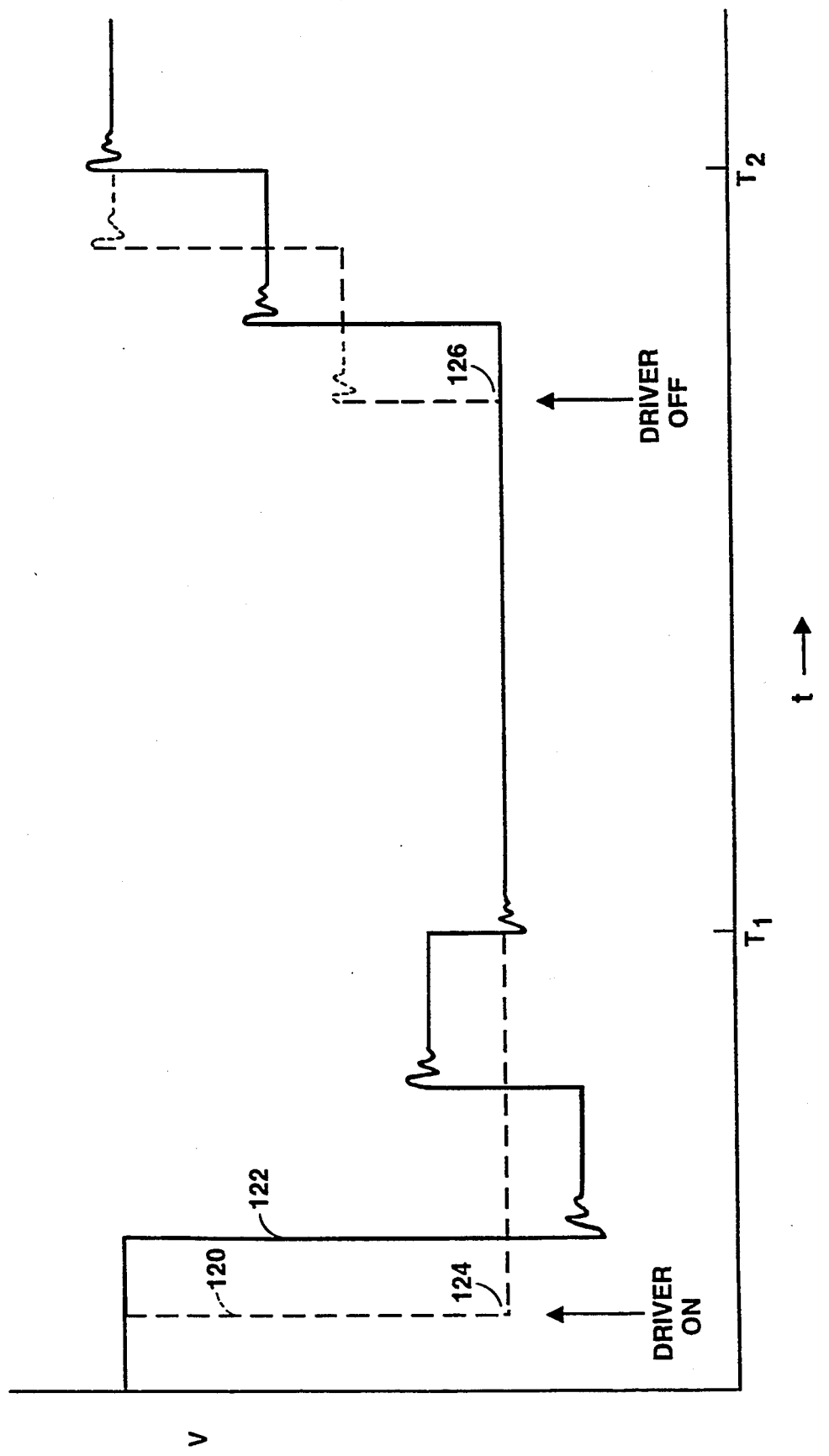
FIG. 4 is the waveform of signal response on a bus terminated by the terminator in FIG. 2.

FIG. 4 depicts the waveform of the signal response on a bus terminated by the terminator known to the art (FIG. 2). In this figure, the driving voltage supplied by the bus driver is shown as a dashed line 120, and the voltage as detected by the bus receiver is shown as a solid line 122. Because of the instability in the voltage, data can not be sampled once the driver turns on 124 until time T₁. Similarly, data can not be sampled once the driver has turned off 126 until time T₂. In the SCSI bus this delay in sampling may be as high as four times the delay imposed by characteristic impedance and the length of the cable (the cable delay).

Figure 4A:
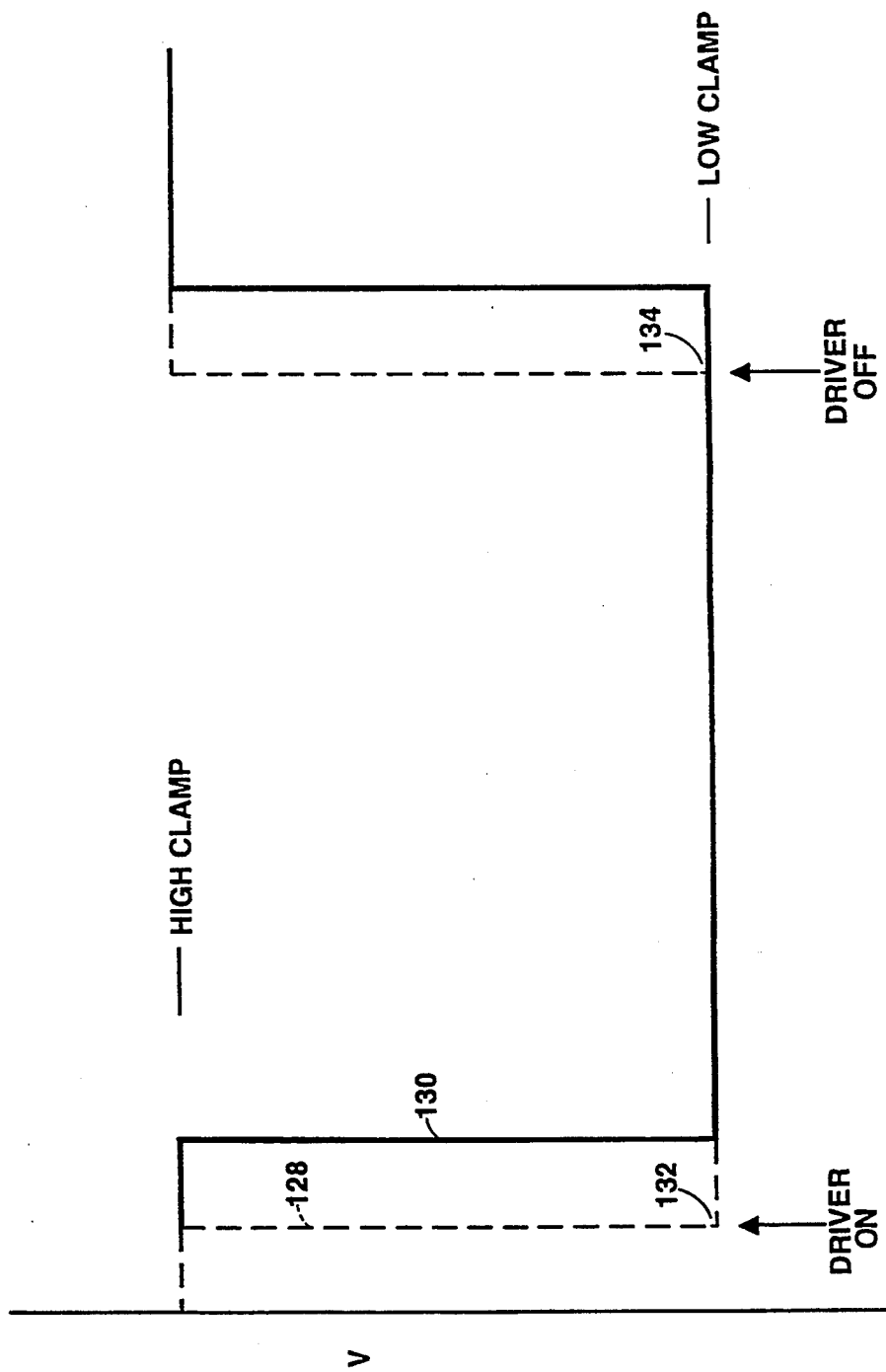
FIG. 4A is the waveform of signal response on a bus terminated by the embodiment of the terminator shown in FIG. 3.

FIG. 4A is the waveform of the signal response on a bus terminated by the embodiment of the terminator shown in FIG. 3. Again the driving voltage supplied by the bus driver is shown as a dashed line 128, and the voltage as detected by the bus receiver is shown as a solid line 130. Because of the voltage clamping supplied by the terminator 16, data can be sampled more rapidly once the driver turns on 132 and turns off 134. In the SCSI bus the delay in sampling is reduced to one cable delay.

Therefore, the bus terminator just described provides maximum current sourcing and excellent positive and negative voltage clamping as well as power reduction when the bus is in the positive steady state.

It is understood that other modifications or embodiments are possible which will still be within the scope of the appended claims. These and other examples of the concept of the invention illustrated above are intended by way of example and the actual scope of the invention is to be determined solely from the following claims.

I claim:

1. A constant current bus terminator comprising:
an output terminal capable of being in communication with a bus of a type having a bus voltage that is pulled to a low voltage level when a driver asserts a signal thereon, said bus voltage being permitted to rise when said driver releases said bus; and
a current source in communication with said output terminal, said current source supplying a substantially constant current flowing from said current source into said output terminal when said bus is asserted by said driver in order to pull up the bus voltage when said driver releases said bus.

2. The constant current bus terminator of claim 1 wherein said current source comprises a static current source in communication with a first current mirror, said first current mirror being in communication with said output terminal.

3. A constant current bus terminator comprising:
an output terminal capable of being in communication with a bus of a type having a bus voltage that is pulled to a low voltage level when a driver asserts a signal thereon, said bus voltage being permitted to rise when said driver releases said bus;
a current source in communication with said output terminal, said current source supplying a substantially constant current to said output terminal when said bus is asserted by said driver in order to pull up the bus voltage when said driver releases said bus;
a negative voltage clamp in communication with said output terminal, said negative voltage clamp preventing a voltage on said output terminal from decreasing below a first predetermined value; and
a positive voltage clamp in communication with said output terminal, said positive voltage clamp preventing a voltage on said output terminal from increasing above a second predetermined value.

4. A constant current bus terminator comprising:
an output terminal capable of being in communication with a bus;
a current source in communication with said output terminal, said current source supplying a substantially constant current to said output terminal;
a negative voltage clamp in communication with said output terminal, said negative voltage clamp preventing a voltage on said output terminal from decreasing below a first predetermined value wherein said negative voltage clamp comprises a first current mirror, said first current mirror being in communication with said output terminal; and
a positive voltage clamp in communication with said output terminal, said positive voltage clamp preventing a voltage on said output terminal from increasing above a Second predetermined value.

5. The bus terminator of claim 4 wherein said first current mirror comprises a pair of transistors connected base to base and said negative voltage clamp further comprises a diode in communication between the bases of the transistors of the first current mirror and ground.

6. The constant current bus terminator recited in claim 4 wherein said current source comprises a static current source in communication with a second current mirror, said second current mirror being in communication with said output terminal.

7. A constant current bus terminator comprising:
an output terminal capable of being in communication with a bus;
a current source in communication with said output terminal, said current source Supplying a substantially constant current to said output terminal;
a negative voltage clamp in communication with said Output terminal, said negative voltage clamp preventing a voltage on said output terminal from decreasing below a first predetermined value; and
a positive voltage clamp in communication with said output terminal, said positive voltage clamp preventing a voltage on said output terminal from increasing above a second predetermined value, wherein said positive voltage clamp comprises:
a first resistor connected in parallel with a diode, said first resistor having a first terminal and a second terminal, said first terminal of said first resistor in communication with said output terminal; and
a diode having a first terminal and a second terminal, said first terminal of said diode in series communication with a first terminal of a second resistor and said second terminal of said diode in series communication with said second terminal of said first resistor,
said second terminal of said second resistor in communication with a first power supply.

8. A constant current bus terminator comprising:
an output terminal capable of being in communication with bus;
a current source in communication with said output terminal, said current source supplying a substantially constant current to said output terminal;
a negative voltage clamp in communication with said output terminal, said negative voltage clamp preventing a voltage on said output terminal from decreasing below a first predetermined value;
a positive voltage clamp in communication with said output terminal, said positive voltage clamp preventing a voltage on said output terminal from increasing above a second predetermined value; and a first disconnect control in communication with said positive voltage clamp for controlling the impedance of said output terminal.

9. The constant current bus terminator of claim 8 wherein said first disconnect control comprises a positive voltage clamp disconnect circuit in communication between said positive voltage clamp and a power supply for said positive voltage clamp, said positive voltage clamp disconnect circuit for controlling the communication between said positive voltage clamp and said power supply for said positive voltage clamp.

10. A constant current bus terminator comprising:
an output terminal capable of being in communication with bus;
a current source in communication with said output terminal, said current source supplying a substantially constant current to said output terminal;
a negative voltage clamp in communication with said output terminal, said negative voltage clamp preventing a voltage on said output terminal from decreasing below a first predetermined value;
a positive voltage clamp in communication with said output terminal, said positive voltage clamp preventing a voltage on said output terminal from increasing above a second predetermined value; and
a second disconnect control in communication with said negative voltage clamp for controlling the impedance of said output terminal.

11. A constant current bus terminator comprising:
an output terminal capable of being in communication with a bus;
a current source in communication with said output terminal, said current source supplying a substantially constant current to said output terminal;
a negative voltage clamp in communication with said output terminal, said negative voltage clamp preventing a voltage on said output terminal from decreasing below a first predetermined value;
a positive voltage clamp in communication with said output terminal, said positive voltage clamp preventing a voltage on said output terminal from increasing above a second predetermined value; and
a third disconnect control in communication with said current source for controlling the impedance of said output terminal.

12. A constant current bus terminator comprising:
an output terminal capable of being in communication with a bus;
a current source in communication with said output terminal, said current source supplying a substantially constant current to said output terminal;
a negative voltage clamp in communication with said output terminal, said negative voltage clamp preventing a voltage on said output terminal from decreasing below a first predetermined value;
a positive voltage clamp in communication with said output terminal, said positive voltage clamp preventing a voltage on said output terminal from increasing above a second predetermined value; and
a current limiting feedback circuit in communication with said positive voltage clamp and said current source, said current limiting feedback circuit, in response to the current through said positive voltage clamp, causing said current source to adjust said current supplied to said output terminal.

13. The constant current bus terminator of claim 12 wherein said current limiting feedback circuit comprises:
a feedback loop transistor having an emitter in communication with said first power supply, a collector in communication with said static current source and a base in communication with said second terminal of said diode.

14. A constant current voltage clamping bus terminator with power reduction circuitry comprising:
an output terminal capable of being in communication with a bus;
a current source in communication with said output terminal, said current source comprising:
a static current source in communication with a first current mirror, said first current mirror being in communication with said output terminal,
said static current source producing a substantially constant current to said output terminal;
a negative voltage clamp in communication with said output terminal, said negative voltage clamp comprising:
a second current mirror comprising a pair of transistors connected base to base, said second current mirror in communication with a buffer transistor, said second current mirror being in communication with said output terminal; and
a diode in communication between the bases of the transistors of the second current mirror and ground,
said negative voltage clamp preventing a voltage on said output terminal from decreasing below a first predetermined value;
a positive voltage clamp in communication with said output terminal, said positive voltage clamp comprising:
a first resistor connected in parallel with a diode, said first resistor having a first terminal and a second terminal, said first terminal of said first resistor in communication with said output terminal; and
a diode having a first terminal and a second terminal, said first terminal of said diode in series communication with a first terminal of a second resistor and said second terminal of said diode in series communication with said second terminal of said first resistor, said second terminal of said second resistor in communication with a first power supply,
said positive voltage clamp preventing a voltage on said output terminal from increasing above a second predetermined value;
a current limiting feedback circuit in communication with said positive voltage clamp and said current source, said current feedback loop comprising:
a feedback loop transistor having an emitter in communication with said first power supply, a collector in communication with said static current source and a base in communication with said second terminal of said diode,
said current limiting feedback circuit, in response to current through said positive voltage clamp, causing said current source to adjust said current produced to said output terminal;
a first disconnect control in communication with said positive
said output voltage clamp for controlling the impedance of terminal, said first disconnect control comprising:
circuit in a positive voltage clamp disconnect communication between said positive voltage clamp and a power supply for said positive voltage clamp, said positive voltage clamp disconnect circuit for controlling the communication between said positive voltage clamp and said power supply for said positive voltage clamp;

a second disconnect control in communication with said negative voltage clamp for controlling the impedance of said output terminal; and a third disconnect control in communication with said current source for controlling the impedance of said output terminal.

15. A bus terminator comprising:

an output terminal capable of being in communication with a bus of a type having a bus voltage that is pulled to a low voltage level when a driver asserts a signal thereon, said bus voltage being permitted to rise when said driver releases said bus; and a current source supplying a current flowing from said current source into said bus when said bus is asserted to pull up said bus voltage as soon as driver releases said bus.

16. The bus terminator recited in claim 15 further comprising:

a negative voltage clamp coupled to said bus for preventing said bus voltage from falling below a first predetermined voltage level.

17. The bus terminator recited in claim 15 wherein said current source additionally supplies a current to said bus when said bus is released.

18. The bus terminator recited in claim 15 further comprising a positive voltage clamp coupled to said bus for preventing said bus voltage from rising above a second predetermined voltage level.

19. A bus terminator comprising:

an output terminal capable of being in communication with a bus of a type having a bus voltage that is pulled to a low voltage level when a driver asserts a signal thereon, said bus voltage rising to a high voltage level when said driver releases said bus;

a current source supplying a current to said bus when said bus is asserted;

a positive voltage clamp coupled to said bus for preventing said bus voltage from rising above a second predetermined voltage level; and a current limiting feedback circuit in communication with said positive voltage clamp and said current source, said current limiting feedback circuit diverting a portion of said current supplied to said bus from said bus when a current through said positive voltage clamp reaches a predetermined level.

20. A method of terminating a bus of a type having a bus voltage that is pulled to a low voltage level when a driver asserts a signal thereon, said bus voltage being permitted to rise when said driver releases said bus, comprising the steps of:

supplying a current flowing into said bus when said bus is asserted to pull up the bus voltage as soon as said driver releases said bus; and providing a negative voltage clamp to prevent a bus voltage on said bus from falling below a predetermined level.

21. The method of terminating a bus recited in claim 20 wherein said current supplying step includes the step of providing a substantially constant current to said bus regardless of the level of said bus voltage when said bus voltage is within a predetermined range.

22. The method of terminating a bus recited in claim 19 wherein said current supplying step further comprises the step of supplying said current to said bus when said bus is released.

23. A method of terminating a bus of a type having a bus voltage that is pulled to a low voltage level when a driver asserts a signal thereon, said bus voltage being permitted to rise when said driver releases said bus, comprising the steps of:

supplying a current to said bus when said bus is asserted to pull up the bus voltage as soon as said driver releases said bus;

providing a negative voltage clamp to prevent a bus voltage on said bus from falling below a predetermined level; and providing a positive voltage clamp to prevent said bus voltage from rising above a second predetermined voltage level.

24. The bus terminator recited in claim 23 wherein said predetermined range of bus voltage is between said first predetermined level of said negative voltage clamp and said second predetermined level of said positive voltage clamp.

25. A method of terminating a bus comprising the steps of:

supplying a current to said providing a negative voltage clamp to prevent a bus voltage on said bus from falling below a predetermined level;

providing a positive voltage clamp to prevent said bus voltage from rising above a second predetermined voltage level; and sensing a current through said positive voltage clamp and diverting a portion of said current supplied to said bus from said bus when said sensed current through said positive voltage clamp reaches a predetermined level.

26. A bus terminator comprising:

an output terminal capable of being in communication with a bus;

a current source in communication with said output terminal, said current source supplying a current to said bus to pull up the bus voltage;

a positive voltage clamp coupled to said bus for preventing said bus voltage from rising above a predetermined voltage level; and a current limiting feedback circuit in communication with said positive voltage clamp and said current source, said current limiting feedback circuit diverting a portion of said current supplied to said bus from said bus when a current through said positive clamp reaches a predetermined level.

27. A method of terminating a bus comprising the steps of:

supplying a current to said bus;

providing a positive voltage clamp to prevent said bus voltage from rising above a predetermined voltage level; and sensing a current through said positive voltage clamp and diverting a portion of said current supplied to said bus from said bus when said sensed current through said positive voltage clamp reaches a predetermined level.

28. A bus terminator comprising:

an output terminal capable of being in communication with a bus;

a current source in communication with said output terminal, said current source supplying a current to said output terminal;

a positive voltage clamp in communication with said output terminal, said positive voltage clamp preventing a voltage on said output terminal from increasing above a predetermined value; and a disconnect control in communication with said positive voltage clamp for disconnecting said positive voltage clamp from said output terminal.

29. A bus terminator comprising:

an output terminal capable of being in communication with a bus;

a current source in communication with said output terminal, said current source supplying a current to said output terminal;

a negative voltage clamp in communication with said output terminal, said negative voltage clamp preventing a voltage on said output terminal from decreasing below a predetermined value; and a disconnect control in communication with said negative voltage clamp for disconnecting said negative voltage clamp from said output terminal.

30. A bus terminator comprising:

an output terminal capable of being in communication with a bus;

a current source in communication with said output terminal, said current source supplying a current flowing from said current source into said output terminal; and a disconnect control in communication with said current source for disconnecting said current source from said output terminal.

* * * * *

UNITED STATES PATENT AND TRADEMARK OFFICE
CERTIFICATE OF CORRECTION

PATENT NO. : 5,414,583
DATED : May 9, 1995
INVENTOR(S) : Mark Jordan

It is certified that error appears in the above-indentified patent and that said Letters Patent is hereby corrected as shown below:

Column   line 22, "$I_{out}32$ $(1+(1+X)I_1$, should read --$(I_{out} = (1+X)I_1$,--.

Column 4, line 2, "the higher 14 the current" should read --the higher the current--.

Column 4, line 10, "$V_H$+BE of transistor 100)" should read --$V_H + V_{BE}$ (of transistor 100)--.

Column 6, line 15, "Second" should read --second--.

Column 6, line 30, "Supplying" should read --supplying--.

UNITED STATES PATENT AND TRADEMARK OFFICE
CERTIFICATE OF CORRECTION

PATENT NO. : 5,414,583
DATED : May 9, 1995
INVENTOR(S) : Mark Jordan

It is certified that error appears in the above-indentified patent and that said Letters Patent is hereby corrected as shown below:

Column 8, line 65-69, "said output voltage clamp for controlling the impedance of terminal, said first disconnect control comprising:
    circuit in" should read
--voltage clamp for controlling the impedance of said output terminal, said first disconnect control comprising:--

Column 9, line 1, "disconnect communication" should read
--disconnect circuit in communication--.

Column 10, line 30, "supplying a current to said" should read
--supplying a current to said bus;--.

Signed and Sealed this

Thirteenth Day of February, 1996

BRUCE LEHMAN

Attest:

Attesting Officer      *Commissioner of Patents and Trademarks*